_United States Patent Office_

3,540,918
Patented Nov. 17, 1970

3,540,918
METHOD OF COATING COPPER
WIRE WITH SOLDER
Hermann Trattner and Erich Leibhard, Munich, Germany, assignors to Siemens Aktiengesellschaft, a corporation of Germany
Filed Mar. 15, 1968, Ser. No. 713,491
Claims priority, application Germany, Mar. 17, 1967, S 108,883
Int. Cl. B05c 11/02; C23c 1/04
U.S. Cl. 117—102
2 Claims

ABSTRACT OF THE DISCLOSURE

An apparatus for continuously coating a copper wire with a solder layer comprising a chamber in which molten solder is disposed, a nozzle disposed at the bottom of said chamber, having a vertically extending passageway therein, for the entrance of the wire to be coated, which communicates with the solder bath through laterally extending passages communicating with the chamber, means disposed above the nozzle forming a counter current section having a counter flow passageway through which the upwardly moving wire passes and in which solder may flow in downward counter direction, said counter flow passageway tapering in cross-section at the beginning and end of the passageway whereby the clearance with respect to the wire is less at such ends than at an intermediate portion thereof and a stripping nozzle disposed above the outlet of said counter flow passageway, the nozzles and the inlet portion of said counter current section preferably being formed from a material not wettable by the solder, and a method of continuously coating a copper wire with a solder layer of at least 7 micrometers thick by means of apparatus, such as the above, in which the wire is passed therethrough at a velocity of approximately 35–38 cm./sec., for a wire diameter of 0.5 mm., with the wire velocity of larger wire diameters being reduced so that it is approximately 20–26 cm./sec. for a wire diameter of 1 mm.

BACKGROUND OF THE INVENTION

The invention is directed to an apparatus for continuously coating a copper wire with a solder layer of pure or impure tin and a method for producing a solder layer having a thickness of at least 7 micrometers in connection with apparatus of the type herein described.

To facilitate and accelerate the soldering operations, particularly in automatic soldering processes of short duration, copper wires are provided, prior to the soldering operation, with a coating of pure or impure tin. The beneficial results to be derived from the tin coating are most satisfactorily obtained, however, only if the coating on the wire is of a uniform thickness or does not fall below a certain predetermined minimum thickness. As a rule, such uniform tin coatings can be produced only by electroplating. Attempts have been made to attain a very uniform tin coating by hot tin plating in which the wire is drawn through a stripping nozzle, subsequent to its passage through the tin bath, and in which the diameter of the nozzle is larger than the diameter of the wire by at least twice the desired thickness of the tin coating. This method of tin coating has failed, however, because the wire, following its passage through the stripping nozzle, may rest upon the latter at one side whereby only a non-uniform eccentric tin layer results.

SUMMARY OF INVENTION

It is the principal object of the invention to impart to the copper wire a good soldering capability by producing a highly efficient and uniformly thick solder layer along the wire periphery concentric with the wire axis.

This objective is achieved according to the invention by drawing the wire in a vertical direction, moving from the bottom upwardly, through an intake nozzle disposed at the bottom of the solder bath with a clearance of approximately 0.4 mm. and which is in communication therewith by means of side passages, with the wire thereat having a clearance of approximately 1.5 mm. The wire then enters a counter current section in which the liquid solder flows counter to the direction of the wire movement. The counter flow passageway of such section, through which the wire and solder travel is provided with end portions which taper to a wire clearance of approximately 0.2 mm., and following passage therethrough the wire is discharged through a stripping nozzle with a clearance of at least 0.2 mm. It has been demonstrated that with such an apparatus a solder layer can be produced on copper wire which will not fall below a minimum layer thickness, and which at the same time will be uniformly thick along the wire periphery. Such a minimum thickness of the layer can be adjusted within a predetermined range by varying the velocity of wire travel through the apparatus.

BRIEF DESCRIPTION OF THE DRAWINGS

The invention is illustrated in detail in the drawings, in which.

DETAILED DECRIPTION

The tin coating apparatus hereinafter specifically described is dimensioned, by way of example, particularly for use in the coating of copper wire having a diameter of 0.5 mm.

Figure 1:
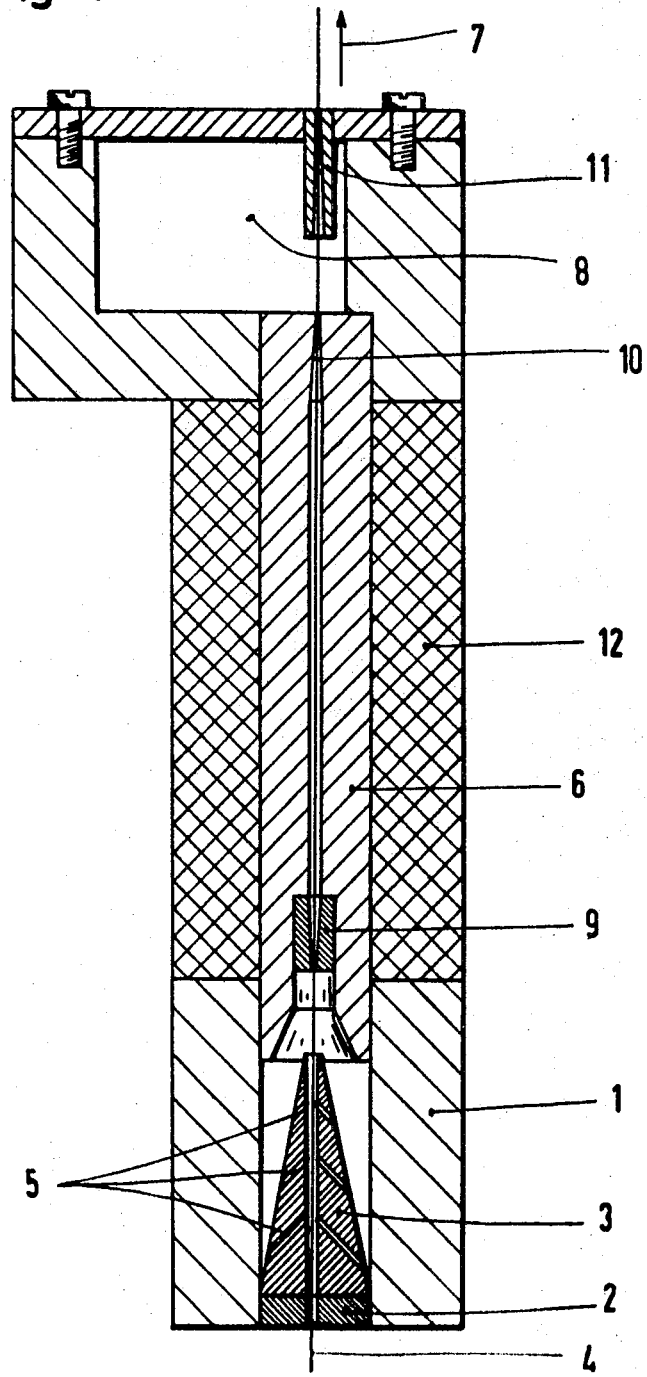
FIG. 1 is a vertical cross-section of a coating aparatus embodying the invention for applying a metal such as tin to wire.

Referring to FIG. 1, the reference numeral 1 designates the bottom part of the tin coating apparatus, which forms a chamber which is sealed at the bottom thereof by a sealing member 2 and an inlet nozzle 3 disposed thereabove. The sealing member 2 is provided with a central hole therein of 0.7 mm. in diameter through which the copper wire enters the apparatus. The sealing member 2 and the inlet nozzle 3 are constructed from a material which is not wettable by the solder, for example, a synthetic material which is not affected by the high temperatures involved, thus achieving an efficient seal with respect to the solder thereat. The inlet nozzle 3 is provided with an inlet opening of about 0.9 mm. in diameter, through which the copper wire 4 passes, liquid solder in the bottom member 1 passing through laterally extending passageways 5 in the nozzle 3 to the wire therein, the passageway in the nozzle adjacent said lateral passageways having a clearance with respect to the wire of approximately 1.5 mm.

Secured to the bottom member 1 is a tubular member 6, the inner diameter of which is 2 mm. and through which the wire 4 passes in an upward direction as indicated by the arrow 7, it being appreciated that the wire will initially have a layer of solder deposited thereon prior to its entry into the tubular member 6. Disposed above the latter and communicating therewith is solder container 8 from which liquid solder may flow downwardly through the passageway formed by the member 6, counter to the direction 7 of wire movement, into the bottom part 1 of the apparatus. The member 6 thus forms a counter current section provided with a counter flow passageway therein through which the wire 4 passes. To achieve a uniform layer of deposited solder it is expedient to provide a nozzle 9 at the lower end of the counter current section and a nozzle 10 at the upper end thereof, the nozzle 9 preferably being constructed of a material which is not wettable by the solder. As illustrated, the passages formed by the respective nozzles 9 and 10 taper towards the outer ends thereof, with a minimum diameter of 0.7 mm. Disposed above the member 6, and forming the wire discharge opening of the apparatus, is a stripping nozzle 11 having an internal diameter which tapers from 0.9 mm. at its inner end to 0.7 mm. at its outer end, through which the wire passes following its exit from the counter current section. The solder container 8 preferably is so dimensioned that it will contain sufficient solder therein to provide for the tin coating of a roll of wire. The operational temperature of the solder bath may be maintained by heating the counter current section 6, for example by a suitable electrical heating resistance element 12.

Figure 2:
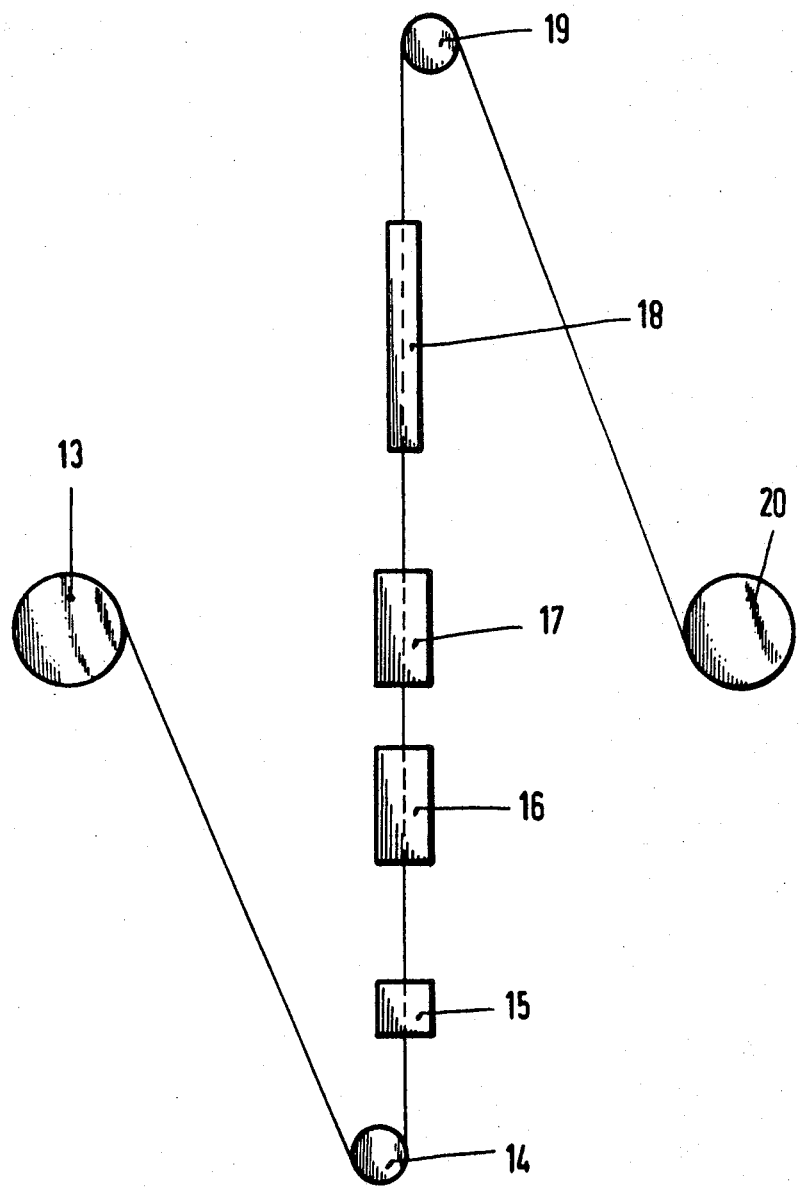
FIG. 2 schematically illustrates an arrangement, employing the apparatus of FIG. 1, for carrying out the method of tin plating in acordance with the invention.

FIG. 2 illustrates an apparatus, incorporating coating devices such as illustrated in FIG. 1, for practicing the method of the invention, in which the copper wire is uncoiled from the roll 13, drawn over a rerouting sheave or roller, and passed through a suitable bath of solder 15.

The wire then passes through the tin coating apparatus 16 and the remelting apparatus 17, both of which are constructed in the manner illustrated in FIG. 1 and previously described. Following passage the remelting apparatus 17 the wire passes through a suitable cooling device 18, comprising a tubular member through which compressed air flows, and upon its exit from the cooling device, the wire is passed over a rerouting sheave or roller 19 and wound upon the roll 20.

The arrangement of the tin plating apparatus 16 and the remelting apparatus 17, illustrated in FIG. 2, in which they are disposed in a series relation, results in a faultless tin plated surface on the copper wire and prevents the irregularities occurring on the wire surface where only a single apparatus is employed, particularly as wire velocities are increased. It has been ascertained that in such an arrangement the most favorable transport velocity of a wire of 0.5 mm. diameter is approximately 35-38 cm./sec., at which a minimum layer thickness of 7 micrometers is obtained.

To tin plate wires having larger diameters, various inlet nozzles, counter current sections and strip nozzles have been made and tested with the corresponding wires, and it has been ascertained that the most favorable transport velocity of wires having diameters larger than 0.5 mm. is smaller than the most favorable transport velocity of wire having a diameter of 0.5 mm. Thus, for a wire of a diameter of 1 mm., the most favorable transport velocity has been determined at approximately 20-26 cm./sec.

Changes may be made within the scope and spirit of the appended claims which define what is believed to be new and desired to have protected by Letters Patent.

We claim:
1. A method of continuously coating a copper wire with a solder layer at least 7 micrometers thick comprising the steps of passing the wire vertically upwardly through an inlet nozzle disposed in the bottom of a chamber in which molten solder is contained, applying solder to said wire as it passes through said nozzle, thereafter passing said wire through a nozzle with a tapering passageway into contact with solder flowing downwardly counter to the wire travel, passing said wire through a further nozzle with a tapering passageway disposed at the upper end of the solder counter flow, and thereafter discharging said wire through a stripping nozzle having a passageway which tapers toward its outer end, transporting said wire through the various steps at a velocity of approximately 35-38 cm./sec. for a wire of 0.5 mm. diameter, and reducing the velocity where larger wire diameters are involved to approximately 20-26 cm./sec. for a wire of 1 mm. diameter.

2. A method according to claim 1, comprising in further combination, applying solder to said wire prior to its entry into said inlet nozzle, and following discharge of said wire from said stripping nozzle, passing the wire through a remelting operation comprising a second series of steps as defined in claim 1, and cooling the wire, following its discharge from the stripping nozzle of said remelting operation, by subjecting the wire to a flow of compressed air.

References Cited
OTHER REFERENCES

| | | | |
|---|---|---|---|
| 1,323,883 | 12/1919 | Lutz. | |
| 1,496,309 | 6/1924 | Girvin. | |
| 1,943,818 | 1/1934 | Fantone et al. | 118—405 X |
| 2,072,060 | 2/1937 | Schultz. | |
| 2,092,284 | 9/1937 | McCarroll et al. | |
| 2,320,412 | 6/1943 | Cook | 118—405 X |
| 2,394,066 | 2/1946 | Kauth. | |
| 2,394,545 | 2/1946 | Grupe. | |
| 3,090,352 | 5/1963 | Knapp | 118—405 |
| 3,112,226 | 11/1963 | St. Jean. | |
| 3,227,577 | 1/1966 | Baessler et al. | |

ALFRED L. LEAVITT, Primary Examiner

J. R. BATTEN, Jr., Assistant Examiner

U.S. Cl. X.R.

117—114, 119.2, 128; 118—405